Figure 1:
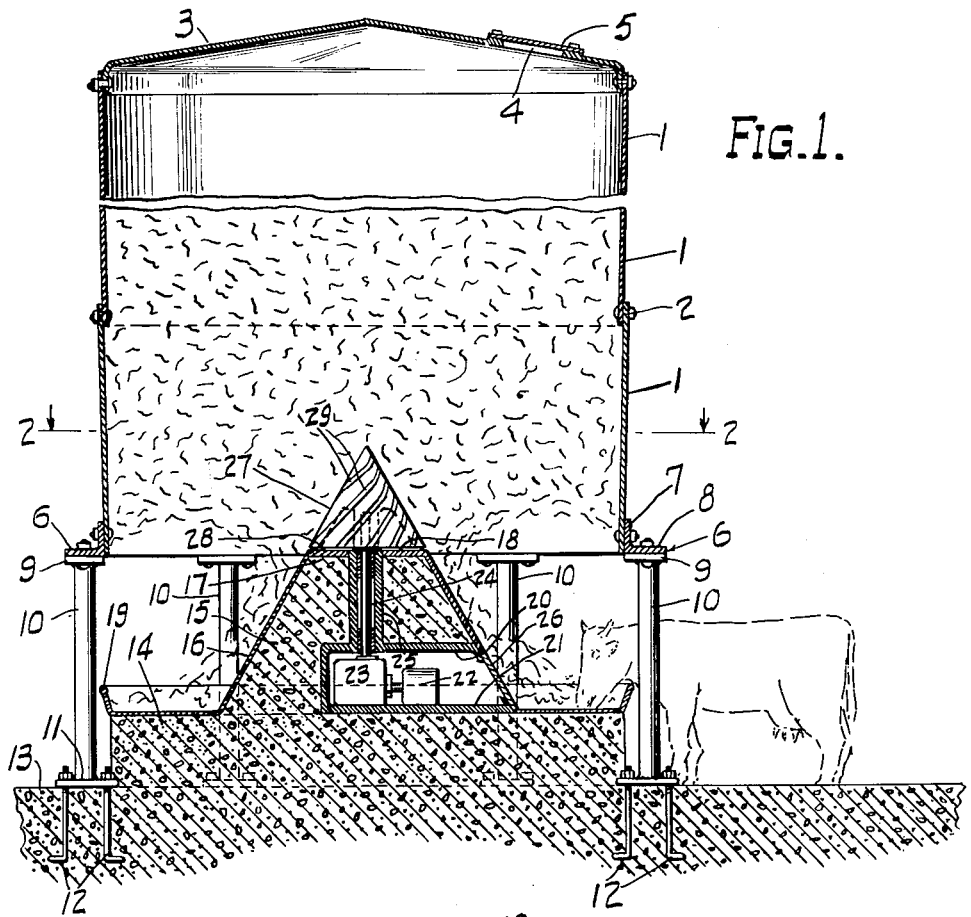

July 24, 1956 W. G. MARTIN 2,755,771
ROTARY FEED AGITATOR FOR A SELF-FEEDING SILO
Filed July 28, 1952

INVENTOR.
Wesley G. Martin
BY
Andrew & Scealer
ATTORNEYS.

United States Patent Office 2,755,771
Patented July 24, 1956

2,755,771

ROTARY FEED AGITATOR FOR A SELF-FEEDING SILO

Wesley G. Martin, Milwaukee, Wis., assignor to A. O. Smith Corporation, Milwaukee, Wis., a corporation of New York Application July 28, 1952, Serial No. 303,283

2 Claims. (Cl. 119—52)

This invention relates generally to storage structures for silage, and particularly to the type known as self-feeding, in which the structure, such as a silo, is open at the bottom to permit animals to feed therefrom.

Generally it is desirable to provide a structural member, such as for instance a conical-shaped member below the open end of the silo, so that the silage as it moves downwardly within the silo, will be diverted laterally by the conical-shaped member, to make it easier for the feeding animals to reach the same.

Self-feeding silos, equipped as above described, appear to have operated quite satisfactorily if the forage crops stored therein are bulky, such as corn, or chopped corn and stalks. However, even with the bulk type of forage crops it is quite often necessary that the operator assist in moving the silage, momentarily, to start the downward movement of the same. When stored, silage is permitted to flow down unevenly, particularly when the silo is substantially full, considerable pressure is built up due to the weight of the silage and this results in compacting of the same so that it is extremely difficult, for animals to feed into that part of the silage column which might not have moved downwardly at the same rate of speed as the remainder of the column. In these instances it has been necessary to resort to rather drastic means, such as the use of axes, dynamite and the like to break up the compacted mass of material.

In the case of silage made from hay or legumes an even more difficult problem is presented in getting the silage to flow down properly at a uniform rate. When silage is made from hay or from grasses, it is the general practice to chop the material into the short lengths, generally not over four or five inches and then blow the chopped material into the silo through the top. As the chopped material falls in the silo, the pieces generally come to rest in a substantially horizontal plane and as a column of this type of silage builds up, very substantial pressures are built up at the bottom of the column.

If the stored silage, just described, is to be fed out within a relatively short period of time the cattle will generally have little difficulty in feeding out of the silage, inwardly toward the center of the silo for a distance as far as they are able to reach. With the ordinary size of silo, which is generally fourteen feet in diameter the feeding cattle are unable to reach into the center and this results in a column of silage which is not being moved. This will occasion very substantial pressures at the base of this center column and compacting of the silage which is very undesirable. This undesirable result is occasioned by the fact that grass silage has a tendency to "set down" on any object disposed in its path of movement, and this is true even though the object should normally be able to pierce the silage such as for instance the sharp apex of a cone extending upwardly into the silage from beneath the open end of the silo.

The present invention is directed to a self-feeding silo having a cone or the like disposed beneath the open end of the silo, with the apex of the cone extending upwardly a short distance into the silage column, and having the apex of the cone provided with auxiliary mechanical means to loosen and move a portion of the center of the column of silage outwardly so that the silage will pass downwardly over the inclined surface of the cone to be diverted laterally so that no compacting of the silage will result near the center of the column and so that the silage from this area will be diverted laterally to permit the feeding cattle to reach the same.

The object of the invention therefore is to provide a self-feeding silo for the storage of silage, and particularly hay and grass silage, which has means disposed adjacent the lower or open end of the silo, to aid in the uniform downward flow of the silage to cattle feeding from around the base thereof and to prevent compacting of the silage near the center of the column of silage.

Figure 2:
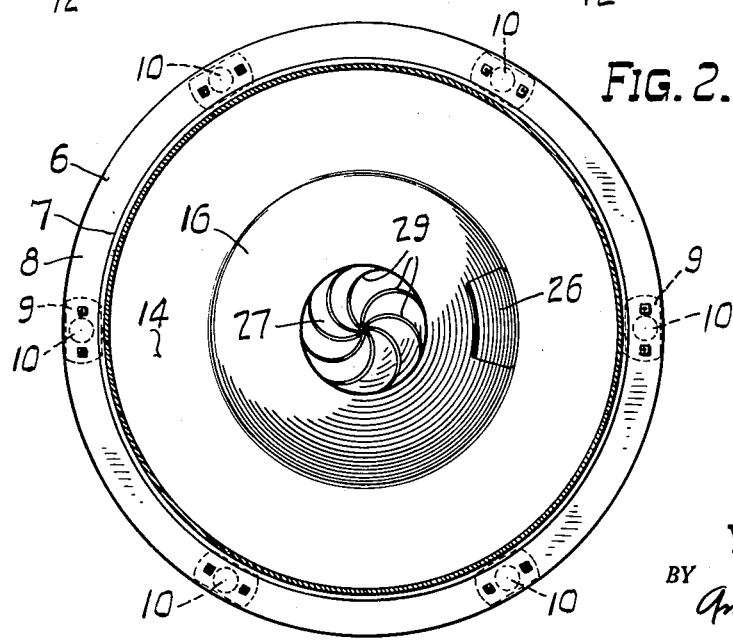

The above and other objects of the invention will appear from the following description when taken in conjunction with the accompanying drawing in which:

Figure 1 is a vertical longitudinal sectional view of a silo with bottom plates forming the lowermost cylindrical section of the silo removed and parts being broken away; and Figure 2 is a transverse sectional view of the silo of the invention taken on line 2—2 of Figure 1.

According to the invention the storage structure, such as a silo, comprises a plurality of cylindrical sections 1 having joints 2 disposed between the sections to join the same together. The joints are preferably filled with a suitable mastic cement or the like to prevent air and moisture from passing therethrough.

The upper end of the silo is provided with a top 3 having an opening 4 disposed therein to receive forage crops into the interior of the silo. The opening is closed when the silo is in a filled condition, with an air and moisture tight cover 5.

As best seen in Figure 1, a plurality of plates, which form the lowermost cylindrical section of the silo, are not shown, as the same have been removed. These plates are disposed in place during filling of the silo and are removed when it is desired to feed-out the silage.

An angular reinforcing ring 6 has a vertically disposed flange 7 secured to the outer surface of the silo adjacent the bottom of the lowermost section 1 and is provided with a horizontally disposed circumferential flange 8 to which is secured a plurality of bearing plates 9 at the upper end of corresponding cylindrical support columns 10. The lower ends of the columns are provided with bearing plates 11 which bear upon the concrete foundation 13 and are secured thereto by anchor bolts 12 firmly embedded in the foundation.

Centrally disposed of and below the open end of the silo, circular feeding apron 14 extends upwardly from the foundation and preferably forms an integral part thereof. The feeding apron should be of a size to permit cattle to feed into the downwardly moving column of silage for a substantial distance toward the vertical center line of the silo.

A cone 15 of reinforced concrete or concrete covered with sheet steel 16 or the like is centrally disposed on the feeding apron and has its upper end 17 disposed toward the open lower end of the silo. The end 17 is preferably flat, rather than pointed, and the sheet steel cover 16 is formed inwardly at 18 to cover a substantial portion of the flat surface of the end. The cover 16 may be extended across the upper surface of feeding apron 14 and have its outer circumferential edge formed upwardly to provide a curb 19 to retain the silage on the feeding apron to be eaten by cattle which enter between the cylindrical supports 10.

The feeding apron on the curb is of a height to accommodate animals in not only feeding from the feeding apron but which will also permit the animals to feed upwardly into the silage column should they so desire.

Mechanical means are provided adjacent the upper end of the cone to assist in dislodging the silage immediately above the cone and to force the same outwardly so that it will flow downwardly over the sides of the cone onto the feeding apron 14.

For the above purpose a housing 20 of relatively heavy gauge metal is disposed within the interior of the cone 15 and provides a support 21 for motive power to operate the above referred to mechanical means. This may preferably consist of a motor 22 which operates through a speed reducing unit 23 to drive a vertically disposed drive shaft 24 extending upwardly through the housing 20. The drive shaft may be disposed in an elongated bearing member 25 which extends from the top of the housing upwardly through the upper end 17 of the cone. The bearing and drive shaft are preferably disposed centrally of the cone and consequently centrally of the silo itself.

A gasoline engine may be used instead of the electric motor illustrated, if desired, and with either unit suitable means such as a door 26 should be provided through the side of the cone so that access may be had to the particular unit for maintenance.

A cutting tool 27 such as an auger is disposed at the upper end of the drive shaft 24 and preferably extends upwardly into the silage mass for a substantial distance. It is preferable that the configuration of the cutter conform to that of a cone and that the base 28 of the cutter be not less in area than the area of the flat top 17 of the concrete cone 15 so that when the two members are mounted in juxtaposition a conical-shaped unit results and the cutter comprises the apex of the cone. In utilizing a cutter of conical shape and of a size above described there will be no likelihood of hay or grass silage sitting down on any ledges between the two members such as would be the possibility if the individual units were not complementary to one another in forming a member of overall conical shape. It is to be understood, however, that a cutter of other shape may be employed if desired.

Preferably the cutter is provided on its outer surface with sharp ridges or blades 29 which serve to cut into the silage. The ridges may be straight or curved, and as they turn within the mass of silage they not only serve to cut but also to divert the stored material outwardly from the cutter so that the material may fall freely down along the sides of the cone 15 and out onto the feeding apron.

The above described invention provides means associated with a conical shaped member disposed on the feeding apron of a self-feeding silo for cutting into a vertically disposed column of silage directly over the cone to prevent the silage, particularly hay or grass silage from coming to rest and hanging on the apex of the cone. The invention further provides means for dispelling the silage laterally from the cutter means so that the same will fall freely along the sides of the cone downwardly to a position where it might be consumed by animals feeding from the bottom of the silo.

Various embodiments of the invention may be employed within the scope of the following claims.

I claim:

1. A storage structure for the storage and self-feeding of silage comprising, a foundation, a generally cylindrical shell having the lower end thereof disposed in a substantially horizontal plane and spaced above the foundation, circumferentially spaced support means for supporting said shell above the foundation, an annular feeding apron associated with the foundation and disposed concentrically of the shell, stationary radial deflecting means for the silage disposed on the foundation centrally of the feeding apron, said deflecting means having a generally frusto-conical shape and the upper end of the deflecting means terminating substantially at said horizontal plane, rotatable silage dislodging means carried by said deflecting means and extending upwardly a substantial distance above said horizontal plane into said shell, said dislodging means having a generally conical shape with the base portion having a diameter substantially equal to the diameter of the upper end of said deflecting means, and drive means to rotate said dislodging means and dislodge the silage adjacent said dislodging means, said deflecting means serving to deflect the dislodged silage radially to the feeding apron.

2. A storage structure for the storage and self-feeding of silage comprising, a foundation, a generally cylindrical shell having the lower end thereof disposed in a substantially horizontal plane and spaced above the foundation, circumferentially spaced support means for supporting said shell above the foundation, a generally conical member supported by the foundation and disposed generally centrally of said shell, said conical member having a stationary base portion extending upwardly from the foundation to a position generally in said horizontal plane and having a separate rotatable apex portion extending upwardly from said base portion a substantial distance above said plane into said shell, an annular feeding apron associated with the foundation and disposed around the base portion of the conical member, and drive means disposed within the base portion of said conical member for rotating said apex portion to dislodge silage in the area adjacent said apex member, said base portion serving to conduct the dislodged silage to the feeding apron for feeding.

References Cited in the file of this patent

UNITED STATES PATENTS

| | | |
|---|---|---|
| 1,301,051 | Hart | Apr. 15, 1919 |
| 2,638,871 | Ruedemann | May 19, 1953 |

FOREIGN PATENTS

| | | |
|---|---|---|
| 453,262 | France | Mar. 31, 1913 |